Oct. 29, 1957 D. M. LIPKIN 2,811,652

PULSE TYPE TRANSVERSE MAGNETIC AMPLIFIER

Filed March 17, 1955 3 Sheets-Sheet 1

INVENTOR.
DANIEL M. LIPKIN
BY
Charles G. Ensfield
AGENT

PULSE TYPE TRANSVERSE MAGNETIC AMPLIFIER

Filed March 17, 1955 3 Sheets-Sheet 2

INVENTOR.
DANIEL M. LIPKIN
BY Charles C. English

PULSE TYPE TRANSVERSE MAGNETIC AMPLIFIER

Filed March 17, 1955 3 Sheets-Sheet 3

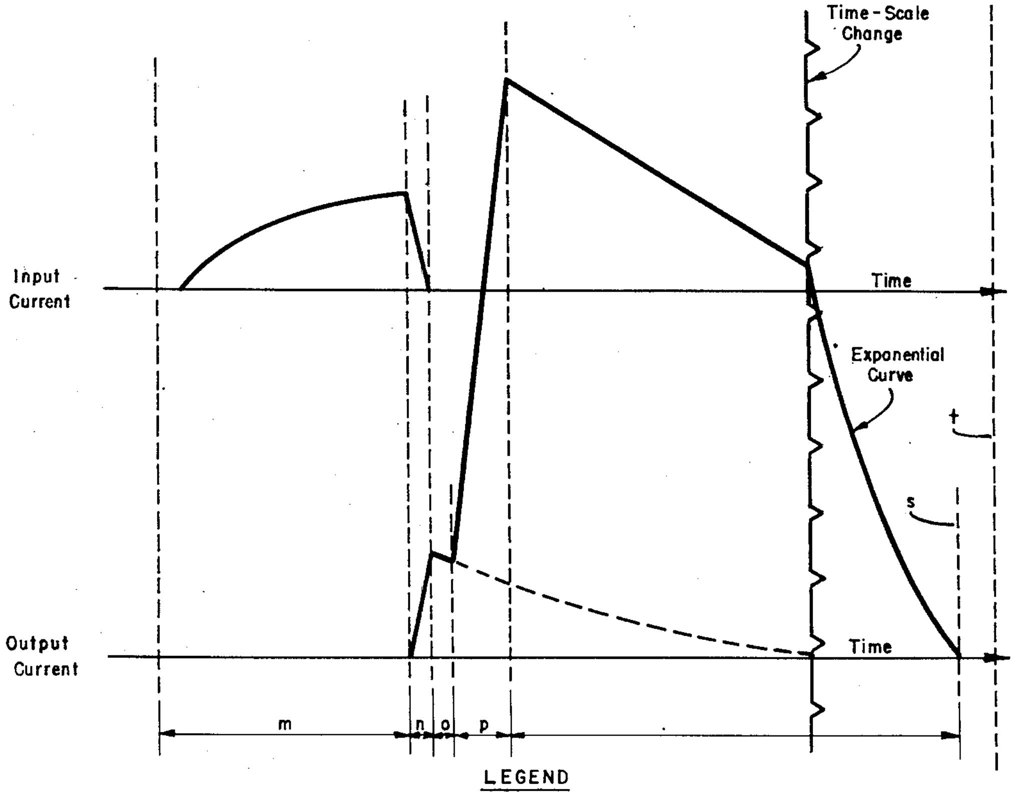

LEGEND m – Period Allotted For Reception Of Input Information
n – Input Current Blocked Off; Output Current Duplicates Input Current In Terms Of Ampere-Turns
o – Preliminary Output Current Falls Off Somewhat While Awaiting Drive Pulse
p – Drive Pulse Applied; Output Current Rises To Peak
r – Drive Pulse Maintained; Output Current Falls Off Exponentially
s – Output Pulse Vanishes
t – Drive Pulse And Input Blocking Pulse Removed; Amplifier Ready For Next Operation

FIG. 8.

INVENTOR.
DANIEL M. LIPKIN
BY
Charles C. English
AGENT

United States Patent Office 2,811,652

Patented Oct. 29, 1957

2,811,652

PULSE TYPE TRANSVERSE MAGNETIC AMPLIFIER

Daniel M. Lipkin, Philadelphia, Pa., assignor, by mesne assignments, to Sperry Rand Corporation, a corporation of Delaware Application March 17, 1955, Serial No. 494,907

11 Claims. (Cl. 307—88)

The present invention concerns pulse type transverse magnetic amplifiers.

It is an object of the invention to provide a pulse type transverse magnetic amplifier which operates over a range of inputs which includes a zero input.

It is an object of the invention to provide a pulse type transverse magnetic amplifier for use in computer circuits for all inputs in the operating range, the output being directly proportional to the input in amplitude, although possibly delayed in time. For example, there is a zero output for a zero input and there are proportional positive outputs for positive inputs; and in those cases in which the amplifier is operated for negative inputs, there are proportional negative outputs.

It is an object of the invention to provide a transverse magnetic amplifier for use in computer circuits in which the input and output power levels are not determined by any parameters of the amplifier and may be arbitrarily small without prejudice to the operation of the amplifier. In such a device the volume of core material used and the pulse repetition frequency are so selected that they merely affect the reactive energy requirement on the auxiliary power source.

It is an object of the invention to provide a transverse magnetic amplifier for use in computer circuits in which the power gain of any one of the forms of the amplifier is in principle determined only by the extent to which the auxiliary power source can accommodate copper losses. For example, the power gain is determined by the minimum efficiency of the auxiliary power source which is permissible. It will be seen that the power gain can easily be made much greater than one.

It is an object of the invention to provide a transverse magnetic amplifier of the pulse type for use in computer circuits in which the rise time of the output pulse is in principle determined only by the rise time of the power pulse provided by the auxiliary power source, that is, the characteristics of the device itself do not materially affect the slope of the advancing front of the signal pulse or wave applied to the device.

It is an object of the invention to provide a transverse magnetic amplifier of the pulse type in which the power gain bandwidth figure depends almost exclusively on the design of the auxiliary power source.

It is an object of the invention to provide a transverse magnetic amplifier for use in computer circuits having a tubular core with a D. C. bias winding thereon for saturating the core, a drive winding for pulsing the core to aid the bias current, an input winding having a blocking source and an output winding, both threading the core. This invention comprises the basic pulse type amplifier and is particularly adaptable for amplifier use in computer circuits.

It is an object of the invention to provide a transverse magnetic amplifier of the pulse type in which the core configurations can be such as to eliminate completely any toroidal winding problem. For example, the toroidal winding may be limited to a few turns if desired or the winding may completely fill the toroidal shell, and manufacture by split-shell techniques in which the mating surfaces are ground within a few microns, is employed.

It is an object of the invention to provide a transverse magnetic amplifier of the pulse type in which, for each of the two transverse directions of magnetization, open core construction can be used without any disadvantage except, in the case of one of the two directions, the need for an increased direct current power consumption from a suitable direct current bias source is entailed.

It is an object of the invention to provide a transverse magnetic amplifier of the pulse type in which the core structure is easily adaptable to the symmetrical physical arrangement of a large number of similar amplifiers, all driven by the same auxiliary power source.

It is an object of the invention to provide a transverse magnetic amplifier of the pulse type in which substantially no energy is lost in the core or stored in the core with the possible exception of the energies of initial magnetization. The core, in operation, is designed to act solely as an energy transfer agency and can be likened in mechanical analogy to a rigid level of vanishing inertia connecting two mechanical systems.

It is an object of the invention to provide a transverse magnetic amplifier of the pulse type in which there is a vanishing air coupling between the auxiliary drive circuits on the one hand and the signal input and output circuits on the other hand, because of the arrangement in which the latter circuits act transversely with respect to the first.

The magnetic material here employed for the magnetic cores may have a substantially rectangular hysteresis characteristic. For a detailed discussion of transverse magnetic amplifiers, in connection with the present invention, reference is made to the following copending application: Ser. No. 494,903, filed March 17, 1955.

In the drawings, like numerals refer to like parts throughout.

Figure 8 is a schematic event sequence diagram of one cycle of operation of the transverse magnetization pulse type amplifier disclosed herein.

Figure 1:
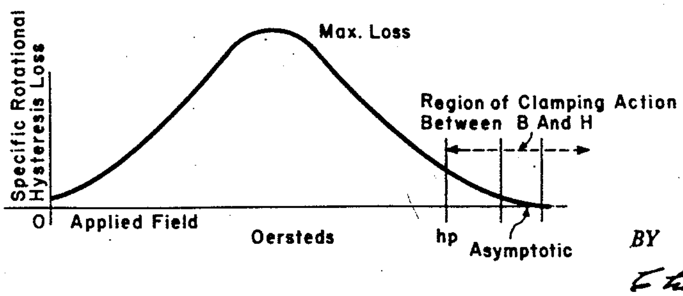
Figure 1 is a loss diagram for magnetic materials to which are applied fields from zero to one which is in excess of that needed to produce saturation.

A saturable reactor with transverse magnetization comprises a device having a magnetic core subjected to a plurality of fields which saturate the core material and produce an oscillation of the saturated magnetization vector of the material which follows to a greater or lesser degree the oscillation of the resultant field vector producing saturation, depending, at least to some extent, upon the value of the field above that required to produce saturation. As the scalar value of the resultant field increases above that required for saturation, experiment shows that the saturated flux vector comes increasingly under the dominance of the resultant magnetic field vector, and although the magnitude of the resultant magnetic flux changes little in value, it becomes to a greater and greater degree aligned with the resultant magnetic field as the field increases beyond the value necessary for saturation of the core material. That is, under such a condition of saturation, the field and flux vectors have substantially the same direction, and as the field vector rotates, the flux vector rotates with it continuing in the same direction as the field vector. At lesser values of the field, the field and flux vectors have different directions and the angle between them may vary. This characteristic of the saturated flux vector having the same direction as the field vector is termed "clamping action between the flux and field vectors B and H" in Fig. 1 and elsewhere in this specification and in certain claims.

The basic considerations concerning transverse devices comprising the present invention may be formulated as follows:

(1) Transverse fields are in general applied to a core of ferromagnetic material simultaneously. It may be noted that the B–H relationships are quantitatively unknown except under the conditions to be described below.

(2) It is possible by means of the invention to obtain quantitatively predictable B–H relationships in transverse core structures, consisting in the resultant B vector being a simple mathematical function of the resultant H vector.

(3) The above is accomplished by observing strictly the condition that the scalar magnitude of the vector resultant magnetizing force be kept above a predeterminable level characteristic of the magnetic material.

A. When the above condition is met, the vector flux density B is substantially given by the vector equation:

$$\vec{B}=\frac{B_s\vec{H}}{h} \qquad (1)$$

where $B_s$ is the saturation flux density magnitude for the material; $\vec{H}$ is the resultant magnetizing force vector in the material; and $h$ is the scalar magnitude of $\vec{H}$. The above equation states that $\vec{B}$ is in the same direction as $\vec{H}$ and has the fixed magnitude $B_s$. This relationship is justified and occurs when the above condition is satisfied.

B. When Equation 1 is satisfied, the core itself does not absorb or store energy even temporarily, but merely serves to transfer energy between the sources of the transverse fields, yielding loss-less operation.

(4) Condition 3 above is met by having at least two transverse fields satisfying the condition:

$$h \geqq hp \qquad (2)$$

where $hp$ is the predeterminable level referred to in 3 above.

(5) In a practical embodiment, a transverse magnetic structure, constructed in accordance with the foregoing considerations, would comprise a body of magnetic material having magnetizing means associated therewith and adapted to impress mutually orthogonal fields on the said body. An output effect may be produced from such a transvers structure by varying the magnitude of at least one of the transverse fields and, so long as the condition represented by Equation 2 is satisfied, the operation of the device will be substantially loss-less.

(6) The predeterminable level $hp$ referred to above may be taken to be that value of magnetizing field larger than the value at which the specific rotational hysteresis loss for the material peaks (see Figure 1) and for which the specific rotational hysteresis loss is appreciably less than said maximum rotational hysteresis loss.

It will be seen from the above that the mutual inductance is not the result of a single field, but is produced by the oscillation of the saturated flux vector through an angle $\theta$ due to the interaction of the two fields and the change in the resultant magnetic field vector with its effect on the saturated magnetic flux vector.

In Figures 2, 3, 4 and 5 are shown a variety of ways in which a transversely magnetized core can be constructed. Associated with each of the cores, there are in general four functions: (1) A direct current bias; (2) an auxiliary power drive; (3) an input signal; and (4) an output. In general, these functions may be carried out by four coils or by as few as two coils, if some of the functions are combined. Insofar as this means that the functions are produced by the same coil, one or more currents performing the functions may flow in the same coil under certain selected conditions. In general, the functions which can be combined in a single coil are: (1) Drive with bias; and (2) input and output.

For purposes of clarity, in the following figures, in general, separate coils will be used, though it will be understood that combinations as suggested above can be made. Again, in many cases a single wire will be shown as a winding; but it should be understood that in all such cases the number of turns is a question of design and the disclosure is not to be limited to a single wire merely because one wire is shown.

Figure 2:
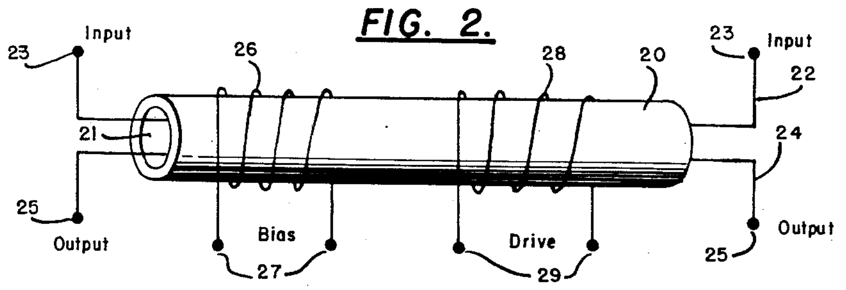
Figure 2 is a schematic diagram of one form of tubular core with windings according to the invention.

In Figure 2 a core of magnetic material 20 takes the form of an elongate tube having a central channel 21 through which is threaded an input winding 22 supplied with terminals 23. Also threading the channel 21 is an output winding 24 having output terminals 25. Around the curved cylindrical surface of core 20 is wound a bias winding 26 having terminals 27, and spaced therefrom is a drive winding 28 having terminals 29.

From the above discussion it will be seen that a direct current bias supply is connected to terminals 27; this bias current is, in general, sufficient to produce a field large enough completely to saturate the material of core 20. An auxiliary alternating current, for example, radio frequency, drive is applied to the terminals 29 to produce a variation in the position of the resultant magnetic field vector. The power supplied at 29 need not be sinusoidal, but may be in pulse form if desired, the purpose being to produce a variation in the resultant magnetic field of sufficient size. A signal input of the pulse type, when applied to terminals 23, will produce a transverse field of the general character of the type desired and a resultant field that oscillates, as discussed below. Thereby, there is an oscillation of the saturated magnetization (flux density) vector which follows the oscillating resultant field. The oscillation of this flux density vector produces a coupling like mutual inductance between the windings 22 and 24 (notwithstanding the saturated state of the core 20) and produces an output signal at terminals 25. It will be seen that the device of Figure 2 produces no output in response to the absence of input and produces an output in response to an input signal.

Figure 3:
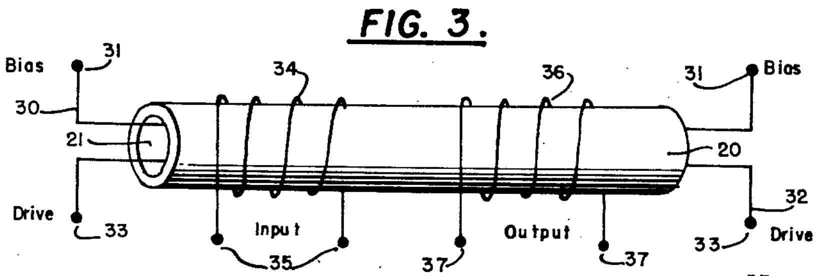
Figure 3 is a variant of the structure of Figure 2 in which similar windings may be employed for other functions.

Figure 3 shows the same structure as that in Figure 2, except that the functions of the several windings are interchanged. It will be seen that the input winding 22 of Figure 2 is now used as a bias winding 30, having terminals 31 for application of D. C. bias supply The output winding of Figure 2 is now used as an auxiliary drive winding 32 having terminals 33. The bias winding of Figure 2 is used as input winding 34 in Figure 3, with input terminals 35. Finally, the drive winding 28 of Figure 2 is used as output winding 36 of Figure 3, with output terminals 37. Here, again the D. C. bias saturating current applied to terminals 31 will produce the necessary magnetic field to saturate the core. The drive power supplied at terminals 33 will produce a variation in the position of the resultant magnetic field vector. As stated above, this causes very little change in the magnitude of the saturated magnetization (flux density) vector because it is already substantially saturated.

The application of an input signal at terminals 35 produces a variable resultant magnetic field vector which experiences rotation and is large enough to carry the resultant saturated flux vector with it. It is this movement of the saturated flux vector which produces an output signal. Here, again an oscillation of the saturated flux vector is produced which causes a coupling like mutual inductance between the windings 34 and 36 (notwithstanding the saturated state of the core 20), and therefore an output is producted at terminals 37 in response to an input at terminal 35; and an absence of output in the absence of any input at terminal 35.

In the discussion of Figures 2 and 3, it will be understood that the representation is entirely general, in that the drive voltages may be sinusoidal but may also be of the pulse type. Again, in some forms it is conceivable that the bias, having been put at a sufficiently high value, the drive winding can be eliminated entirely and the variant character of the input signal utilized to produce an oscillating resultant field vector and therefore an oscillation in the resultant saturated magnetization vector to provide an effective mutual inductance between the input and output windings 34 and 36 (notwithstanding the saturated state of the core 20).

Figures 4, 5, 6A, 6B:
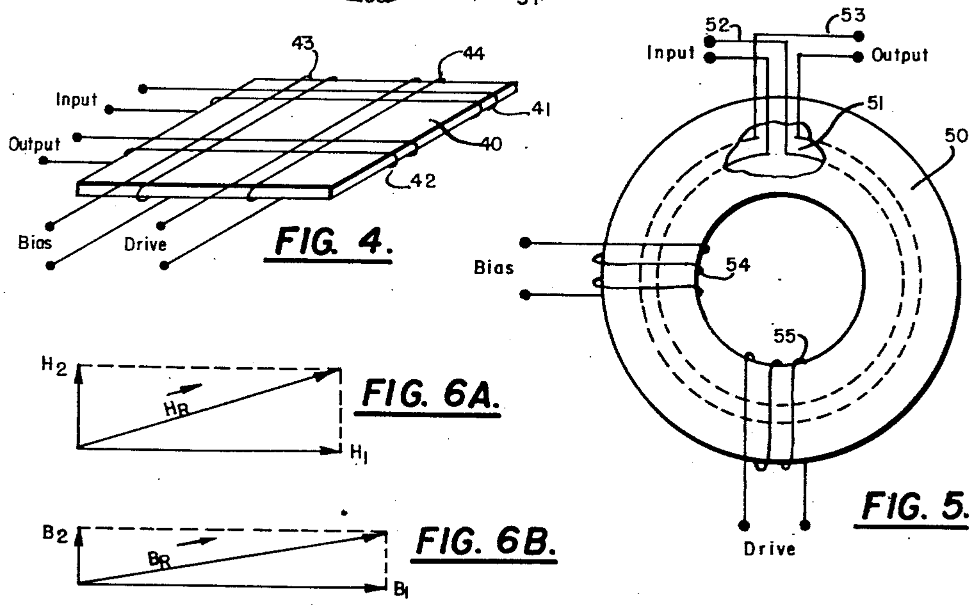
Figure 4 is a schematic representation in perspective of a square wafer type core and windings.
Figure 5 is a plan view of a toroidal type core representing another form of the invention.
Figure 6A is a vector diagram of a possible arrangement of transverse magnetic fields applied to the structure of Figure 5.
Figure 6B is a vector diagram of the resultant of the magnetization vectors produced by the fields of Figure 6A.

Referring to Figure 4, a square wafer type core 40 is shown in which the input and output windings 41 and 42 are shown disposed at right angles to the bias and drive windings 43 and 44. It should be noted that the square wafer form of core 40 may be replaced by a circular one, or by one of an arbitrary shape. One advantage of the circular wafer is that the demagnetization factor remains constant for all orientations of the saturated magnetization vector in the wafer. The wafers 40 can be encased in or molded into a protective container of plastic such as lucite or one of the methacrylates, and other plastic materials having an inert magnetization characteristic. Here, again, the coils may be combined as suggested above.

In Figure 5 there is a toroidal core 50 which is in a shell form, as shown by the edge at the hole 51. Threading the toroidal passage within the core 50 are input and output windings 52 and 53. A bias winding 54 is shown wrapped around the toroidal shell 50, as is also a drive winding 55. Here, again, the bias and drive windings 54 and 55 may be used for input and output and the input and output coils 52 and 53 may be used for bias and drive. As noted above, these pairs of functions are completely interchangeable. In general, in order to disturb the magnetic conditions as little as possible, it is preferable to have the windings 52 and 53 leave the toroidal shell 50 by the same small hole 51. Hole 51 is in general no larger than is necessary for this purpose.

With reference to the structures of Figures 2, 3, 4 and 5, the bias and drive currents together combine to produce within the magnetic core a magnetizing force $H_1$, shown as an abscissa in Figure 6A, which acts at right angles to a magnetizing force $H_2$ which is produced by the combination of input and output currents. Associated with the magnetizing forces $H_1$ and $H_2$ there are magnetizations (flux densities) $B_1$ and $B_2$, shown in vector form in Figure 6B, which link the bias and drive circuits, and the input and output circuits respectively. The vectors $B_1$ and $B_2$ are also disposed normal to each other in space, having the directions of $H_1$ and $H_2$ respectively. As has been discussed above, the vector diagrams may be superimposed, $B_1$ being taken to have the direction of $H_1$ and $B_2$ being taken to have the direction of $H_2$. There is, in general, here no attempt to correlate the scales of the two vector systems, the superposition being largely for convenience in presentation.

In general, in the ferromagnetic core material, the resultant vector $\vec{B}$ will be a complicated function of $\vec{H}$, and also of the past history of $\vec{H}$. However, in the type of operation here discussed, we use the direct current bias to maintain the core, in the absence of current in any of the other circuits, magnetized in the region of diminishing or vanishing rotational hysteresis, as shown in connection with the Figure 1, that is, in a region where the applied field is substantially greater than that corresponding to maximum rotational hysteresis loss. The drive current is limited to either of two values: either to positive values which aid the bias or to zero, and the input and output currents act transversely to these, tending to increase the magnitude of the resultant $\vec{H}$. Hence, the presence of the bias current and the method of operation of the drive current insure that the core will always be magnetized at least into the region of diminishing rotational hysteresis and preferably into the region of vanishing rotational hysteresis, which latter region is labelled in Figure 1 that of "clamping action between B and H."

It will be seen that a sinusoidal drive current need not be employed, but merely one that pulses the D. C. bias and so causes some variation in the magnetizing field. It is this variation, whether it be produced by the drive winding or the input signal winding, which is necessary to cause the resultant field vector to rotate and carry the clamped magnetization vector with it to produce the mutual inductance.

In the region of vanishing rotational hysteresis the $\vec{B}$ vector will always have substantially the same direction as the $\vec{H}$ vector, because of the clamping aligning action of these two vectors.

Figure 7:
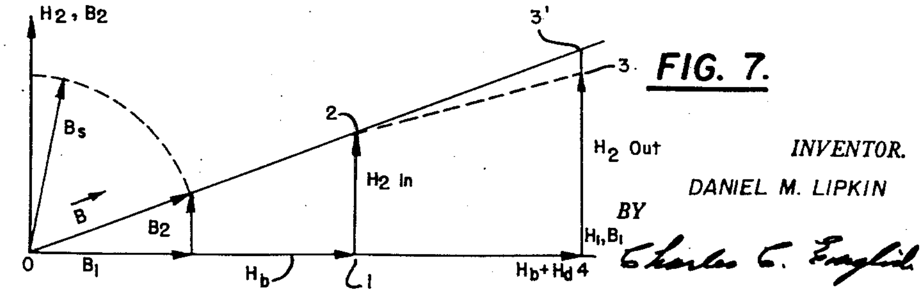
Figure 7 is a vector diagram representing one operation of the amplifiers shown above.

In Figure 7 the diagrams of Figures 6A and 6B are superposed to show the operation while amplifying a signal that may represent a single bit of information. Before the application of signal input current $H_2$ will be zero and $H_1$ has the value $H_b$, determined by the bias current. The magnitude of the bias field applied to the core is represented by the point 1 in the diagram. $H_b$ is large enough so that it saturates the core sufficiently far along its characteristic hysteresis loop to keep the core in the state of vanishing rotational hysteresis. In this state, the $\vec{B}$ vector in the core has the fixed magnitude $B_s$, so that its tip in the diagram of Figure 7 always lies on the dotted circle of radius $B_s$. It will, of course be appreciated that this is an idealized condition and that as a matter of fact $B_s$ does vary a little in magnitude as the resultant value of the field changes. When the core is in the initial H state at 1, in Figure 7, the B vector lies in the direction of the $B_1$ axis in the diagram. When the signal source becomes active and is permitted to act for only a certain time period, it establishes a certain input current which in turn produces the magnetizing force $H_{2IN}$ on the diagram. Thus, the signal source changes the H state of the core from 1 to 2 in the diagram of Figure 7. When the core is in the H state 2, the $\vec{B}$ vector points in the direction along the line joining 2—3'. In this position the $\vec{B}$ vector has the components $B_1$ and $B_2$. $B_2$ is produced as the core moves from the H state 1 to the H state 2. $B_2$ links the output circuit as well as the input circuit, hence the output circuit should be decoupled by means of a diode to prevent any negative current from being induced in it at the same instant that $B_s$ is being produced. The output circuit may be a low impedance circuit, so that the advent of $B_2$ could induce currents in it that would tend to oppose the increase of $B_2$. This action is preferably avoided by the decoupling means referred to. Such decoupling, however, is not necessary if both signal and output circuits use the same winding, as mentioned above.

When the core material has reached the H state 2, as shown in Figure 7, a driving pulse is supplied to the drive coil by the auxiliary power source and it serves to increase the magnetizing force $H_1$ from the bias value $Hb$ to a new, much larger value $(Hb+Hd)$. It is clear that at the completion of the rapid initial rise of the drive current, the H state of the core will be represented in the diagram of Figure 7 by some point on the line 3'—4. Now, at the beginning of the drive pulse, or even earlier, all decoupling is removed from the output circuit, if any is present. Also, the signal input circuit may be decoupled by means of a diode and blocking pulse. If the signal input circuit is decoupled, the current which had existed in it will be transferred to the output circuit by an inductive action that tends to oppose the decay of $B_2$; therefore, $H_2$ would not be lowered. Finally, just before the rise of the drive pulse occurs, the output circuit, having a fairly low impedance, will be definitely coupled to the core and any sudden change in $B_2$ will be able to set up substantial currents in the output circuit. During the rapid rise of the drive current, then, currents induced in the output circuit will tend to resist any change in $B_2$, and $B_2$ will momentarily remain nearly constant. The same will also be true of $B_1$ because of the relationship: $B_1^2+B_2^2=Bs^2$. Therefore, $\vec{B}$ will tend to retain its direction substantially constant. Because of the lack of rotational hysteresis in the core, this momentary fixing of $\vec{B}$ can occur only if the direction of $\vec{H}$ remains nearly fixed for the same instant during which the drive current pulse rises. This constancy of the direction of $\vec{H}$ indicates the locus of the point $H_1$—$H_2$ from the point 2 to the line 3'—4. This path will be some such path as that indicated by the dotted line 2—3. A slight droop of the dotted path 2—3 from the ideal line 2—3' is to be expected because $B_2$ will have to decrease at least slightly during the rise of the drive current. At the completion of the rise of the drive current, the core material will finally arrive in some H state, such as shown at the point 3 in the diagram of Figure 7. When this point is reached, the value of $H_2$ is momentarily equal to that indicated by the vector $H_{2OUT}$, and practically all of this magnitude represents output current, or rather output ampere turns, depending upon whether or not the input circuit of the amplifier has been opened by a blocking pulse and diode.

When the material of the core has reached the H state 3, in the diagram of Figure 7, either of two courses of action may be taken in connection with the drive current. First the drive current may be maintained constant for a term, and in this case the output current will decrease exponentially from its value at 3, and the core will traverse a sequence of H states 3—4 in the diagram. On the other hand, the drive current may be increased or even decreased in time, according to some definite law. The different paths the core material would follow in the $H_1$—$H_2$ diagram for different drives are of course not shown in the diagram of Figure 7.

By increasing the drive current it should be possible to maintain a flap top on the output pulse for a certain period. However, the output pluse will in any event have an exponential die-off at its end, since it would require an impractically high drive current to maintain the output pulse with a flap top for the entire duration of the output pulse.

The most practical, economical or optimum mode of operation is probably the first where the drive current is maintained constant after its initial rise and for the entire duration of the drive pulse. With this mode of operation the output current will have a steep rise followed by an exponential fall to zero. When the output current has fallen to a negligible value, then $H_2$ will be nearly zero, assuming that the signal input current remains blocked off so that it cannot contribute to the value of $H_2$. The H state of the core is then shown by the point 4 in the diagram of Figure 7, and the $\vec{B}$ vector points entirely in the direction of the $B_1$ axis.

When the output current has fallen to this value, the drive current is removed from the drive winding on the core by the auxiliary power source and the core returns to the H state 1, determined by the bias current, and in doing so the core material follows the path 4—1 in the diagram. This operation produces no change whatsoever in the B vector and hence no voltages in any of the circuits. When the core finally returns to its position 1, the blocking pulse is removed from the input circuit, the input voltage having been removed prior to this time, and the core remains in the H state 1 and is ready for the next amplifier operation.

In the course of operation of one amplifier, such as shown above, the successive H states of the core, therefore, trace out a loop 1, 2, 3, 4 in the $H_1$, $H_2$ diagram which coincides with the net transfer of energy from the auxiliary or drive power source to the combination of input and output circuit for each cycle around the $H_1$—$H_2$ loop. This net transfer of energy appears in the output circuit because the input circuit is decoupled at appropriate times, as has been indicated above. There follows concise sequence of steps occurring in one cycle of the operation of the amplifier:

To summarize, the following list of steps in the transverse magnetization pulse amplifier may be set forth as follows, with reference to the time diagram of Figure 8.

*Step 0.*—The core is biased to the point of vanishing rotational hysteresis, continually, by a bias source.

*Step 1.*—The signal current is allowed to act on the core, producing some input current linking the core and the magnetizing field in the core everywhere normal to the direction of the bias magnetizing force. That is, the direct current bias and the fields due to the signal circuit are transverse fields, being effectively orthogonal to each other. During this period, the output circuit is decoupled so as to absorb no energy from the signal circuit.

*Step 2a.*—The decoupling just mentioned is removed from the output circuit and the input current is rapidly cut off by means of a diode and an externally applied power blocking pulse. This act transfers the input current to the output circuit effectively and decouples the input circuit from the amplifier for the remainder of its cycle. The current flowing in the output circuit at this stage of operation, is equivalent in ampere turns, to the original current developed in step 1; and it is this current, flowing in the output circuit, which is acted upon and magnified by the power drive operation which ensues.

*Step 2b.*—The complete decoupling of the signal circuit from the core, achieved in step *2a*, prevents feedback of output power to the circuits which supply the input power for the amplifier. However, if this sort of feedback should not prove objectionable in a particular application, the blocking of the input current can be omitted. In this case, however, whatever output power is fed back to the input signal source will not be available as useful output.

*Step 3.*—At the end of step *2a* there would exist in the output circuit, a current proportional to the original input current developed during step 1. This current in the output circuit is maintained, once set in motion, only by the inductive inertia of this circuit and will tend to fall off exponentially. However, the power drive pulse is applied to the amplifier before this current in the output circuit has had time to decrease noticeably. That is, the drive pulse to be described below is applied immediately following or even coincident in time with the switching operation of step *2a*. The drive pulse is a current pulse applied to a coil wound on the core in such a way that the drive current succeeds in producing a magnetizing force which acts everywhere in the core in the same spatial directions as does the bias magnetizing force. To obtain the maximum amplification, the sum of bias and drive produced magnetizing forces should be as many times larger than that produced by the bias current alone as is practicably obtainable. The drive pulse can be thought of as effectively increasing the value of the bias magnetizing force. The same power source can be made to supply both the bias and the drive and can act through a common bias-drive winding on the core. Using this terminology, it will be seen that the energy gain of the amplifier should be proportional to the ratio of the maximum bias plus drive to the minimum bias alone. The ratio which can be attained in practice depends only on the power ratings that one is able to build into the auxiliary power source, and upon the maximum safe rate of dissipation of Joule heat which one can rely upon in the drive circuit associated with the core.

*Step 4*.—At the end of step 3, the drive current is maintained at its high value. During step 3 the output current, which will have increased its magnitude in step with the increase in the drive current, reaches a large value. From this large value the output current decays to zero exponentially, during step 4 when the drive current is held constant. The output pulse therefore comprises a steep rise followed by an exponential drop to zero.

*Step 5*.—When the output current has fallen to a negligible value, or it may be cut off by a blocking pulse and diode circuit arrangement after a suitable time has elapsed, the drive current is removed.

*Step 6*.—After any signal has been removed, the input circuit is unblocked and the amplifier prepared for the reception of a new input pulse. These steps will appear from an examination of Figure 8 with its accompanying legend.

Figure 8 presents a time graph of a single cycle in the operation of a generic amplifier, and shows the conditions described above as they would obtain in the cycle after the amplifier receives a positive input pulse.

Figure 9:
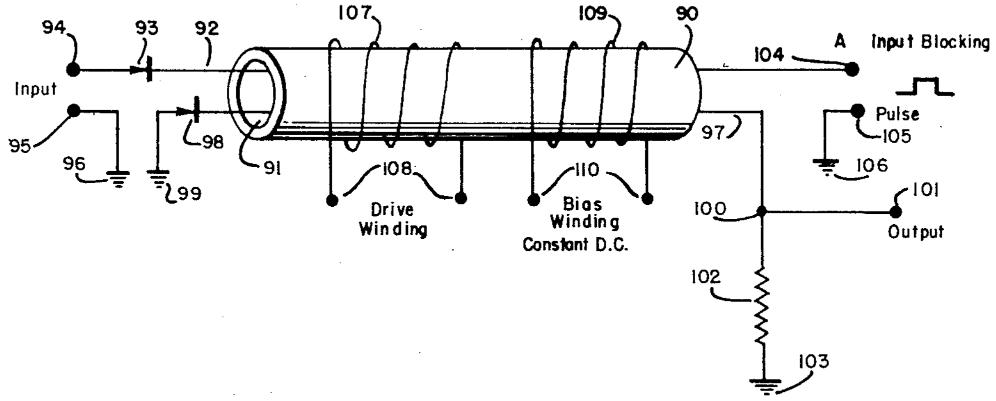
Figure 9 is a schematic diagram of a form of amplifier according to the invention.

Figure 9 is a preferred form of the invention for use in computer circuits. An elongate core of ferromagnetic material 90 is provided with a central channel 91 which is threaded by a winding 92 connected at one terminal to the cathode of diode 93, the anode of which is connected to input terminal 94, the other input terminal 95 being grounded at 96. A second winding 97, which is the output winding, threads channel 91 and has one terminal connected to the cathode of diode 98, the anode of which is grounded at 99. The second terminal of output winding 97 is connected to junction 100 with output terminal 101, and one terminal of load resistor 102, the other terminal of which is grounded at 103. The second terminal of winding 92 is connected to blocking input terminal 104. The other blocking input terminal 105 is grounded at 106. A drive winding 107 surrounds the outside of the core 90 and is provided with terminals 108. A bias winding 109 also surrounds the outside of core 90. Bias winding 109 is supplied with terminals 110 and is spaced from winding 107. A constant D. C. saturating current is supplied at terminals 110. Input blocking terminals 104 and 105 are supplied with input blocking pulses, as shown. The drive current is supplied at terminals 108 and positive input signals are applied, when desired, on terminals 94 and 95. Output, if any, is available across terminal 101 and ground 103. For purposes of discussion, the terminal 104 will be referred to as point A. The operation of the device is as follows:

(1) Point A is at ground potential and the signal input establishes a certain current in the input winding 92. Diode 98 prevents coupling to output circuit 97. The bias winding 109 is supplied with saturating D. C. current and drive winding 107 is inactive.

(2) The input blocking source at terminals 104 and 105 raises the potential of point A to a sufficiently high positive value to block diode 93. This cuts off the signal current in winding 92 rapidly enough to induce an equivalent current in the output circuit 97. It may be noted that load resistor 102 has a small enough value to permit this action to occur.

(3) Simultaneously with 2 above, or immediately thereafter, the current in the drive winding 108 is caused to rise rapidly from zero to a high value, preferably higher by a factor of many times that of the current flowing in bias winding 109. This drive power is supplied by an auxiliary power source connected to terminals 108.

(4) The output current flowing in winding 97 toward junction 100 rises almost proportional with the drive current, reaching a high value and producing amplified output. It then will decay exponentially to zero, as shown in Figure 8. As the drive current is held constant at its high value, with the resistive load 102, the output voltage will be a sharp rise followed by an exponential decay to zero, the sharpness of the rise and the rate of fall being dependent upon the constants of the circuit.

(5) When the output voltage has decayed to zero, the drive current and the input blocking voltage are removed. In this connection it is well to note that one should make certain that any input signal has been removed before removing the input blocking pulse. The removal of the drive current is preferably the last operation occurring in any one cycle of the amplifier, because its removal tends to attenuate any remaining input current which might exist if the input voltage were still partially present after the removal of the input blocking voltage.

It goes without saying that only small changes, as are known to any person versed in the art, are needed to render the circuitry receptive to negative input and blocking pulses. One may change, for example, the direction of conduction of diode 93. Similarly, it is possible to obtain output pulses which are of opposite polarity relative to the input pulses.

Figure 10:
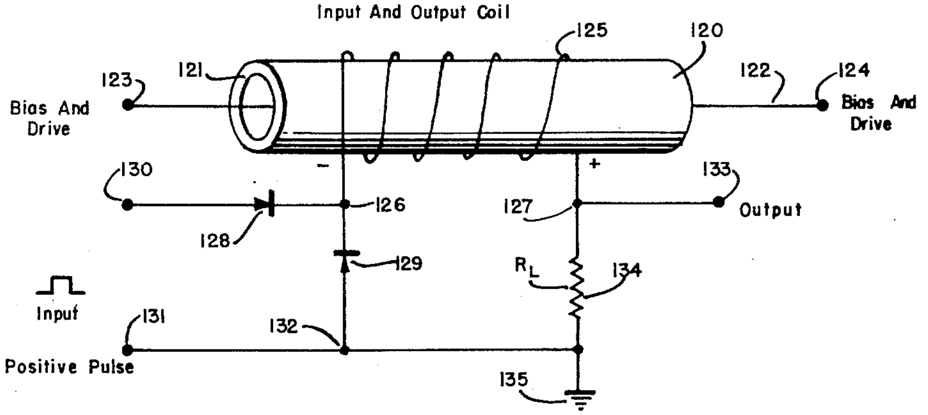
Figure 10 is another form of transverse magnetic pulse type amplifier.

A modified form of transverse magnetic amplifier is shown in Figure 10, in which one winding serves for both input and output and another winding serves for both bias and drive. An elongate ferromagnetic core 120 of cylindrical form is provided with a central channel 121, threaded by combined bias and drive winding 122, having terminals 123 and 124. A combined input and output winding 125 surrounds the outside of core 120 and has its negative terminal connected to junction 126 and a positive terminal connected to junction 127. Junction 126 is connected to the cathodes of diodes 128 and 129. Positive pulse input terminal 130 is connected to the anode of diode 128 and positive pulse input terminal 131 is connected to junction 132 with the anode of diode 129. Junction 127 is connected to output terminal 133 and one terminal of load resistor 134, the opposite terminal of which is grounded at 135. Junction 132 is also grounded at 135. The application of an input signal, which must be in the form of a positive voltage, to terminals 130 and 131 sets up a current in the input-output coil 125 with diode 128 conducting and diode 129 nonconducting. When the drive current is applied to terminals 123 and 124, a voltage in the polarity shown at the terminals of the coil 125, appears across terminals 126 and 127. This voltage is larger than the input voltage at terminals 130 and 131 and causes diode 129 to become conducting. In proportion as the forward resistance of diode 129 is smaller than the impedance of the signal source plus the forward resistance of diode 128, the output energy will be prevented from appearing in the signal circuit. Diode 128 may, in some cases, be omitted. The main output current flows through the output load resistor 134 and diode 129.

The operation of the above two amplifiers may be summarized as follows:

(1) Let the input signal charge up the reactor, (2) Cause the inductance of the reactor suddenly to decrease, preferably by a large factor, (3) Let the "new" inductor discharge into the output circuit. The additional energy which is fed to the output and not supplied by the input source is supplied by the agency which produces the change in inductance of the reactor. The agency in the present case is a sudden increase in a transverse biasing magnetizing force.

It appears that the output of the transverse amplifiers, such as discussed above, has the shape of an inductive discharge, that is, a fast rise followed by an exponential decay to zero. In most digital computers, in which amplifiers of the present type find application, it is desirable that the output of devices, such as shown in Figures 9 and 10, be of the square pulse shape for current discharge from the reactive element. This result is best obtained as presently understood by making the reactive element take the form of a delay line.

While there has been disclosed above what are at present believed to be preferred forms of the invention, the disclosure will suggest variations and equivalent structures to those skilled in the art. All such variants and equivalent structures which fall within the true spirit of the invention are intended to be covered by the generic terminology of the appended claims.

I claim:

1. In a pulse type transverse magnetic amplifier for use in computer circuits, a core of magnetic material, a channel through said core, an input winding threading said channel, said input winding comprising input terminals, a blocking diode, input blocking pulse terminals connected in a series circuit with said input winding and said blocking diode, an output winding threading said channel, said blocking diode being so connected that blocking pulses block current flow in said input winding to cause a current to be induced in said output winding, a signal output terminal and a load impedance connected to said output winding, a drive winding and bias winding wound around said core in a direction orthogonal to said input winding, a direct current power source connected to said bias winding for producing a magnetic field in said core of sufficient magnitude to carry the core material into the region of vanishing rotational hysteresis loss and clamping action between the resultant magnetic field and the resultant magnetic flux produced thereby.

2. The combination set forth in claim 1, said core material being ferromagnetic and having a substantially rectangular hysteresis loop, a supersaturating direct current supply connected to said bias winding.

3. A pulse type transverse magnetic amplifier comprising an elongate core of magnetic material having a channel therethrough, a bias-drive winding threading said channel, an input-output winding wound around said core in a position orthogonal to said bias-drive winding, a buffered input to said input-output winding including a first unilateral impedance, load means, a second unilateral impedance connected across said buffered input and in a circuit with said load means and said input-output winding, said unilateral impedances being so connected that input pulses from said input tend to disconnect said second impedance and pulses induced in said input-output winding tend to render said second impedance conductive to disconnect said first impedance from said input-output winding, and a direct current power source connected to said bias winding for producing a magnetic field in said core of sufficient magnitude to carry the core material into the region of vanishing rotational hysteresis loss and clamping action between the resultant magnetic field and the resultant magnetic flux produced thereby.

4. In a pulse type transverse magnetic amplifier, a core of magnetic material having a channel therethrough, a first winding threading said channel, a second winding threading said channel, a third winding wound around said core orthogonal to said first and second windings, a fourth winding wound around said core orthogonal to said first winding, means for applying input signals to one of said first and third winding to establish a magnetization and for applying a bias to the other thereof, means for deriving output signals from one of said second and fourth windings and for applying an intermittent drive to the other thereof, said bias and drive producing magnetization along parallel directions and being such as to maintain said core in a saturated state during operation, and means for terminating current flow in said input signal winding once established thereby to induce a current in said output winding and provide thereby a magnetization transverse to that of said bias and drive whereby said output winding is coupled to said drive winding.

5. The combination set forth in claim 4 with said core being an elongate hollow cylinder of ferromagnetic material having a substantially rectangular hysteresis loop.

6. The combination set forth in claim 5 with said first and said second windings comprising input and output windings, said third and said fourth windings comprising drive and bias windings, a direct current power source connected to said bias winding for producing a magnetic field in said core of sufficient magnitude to carry the core material into the region of vanishing rotational hysteresis loss and clamping action between the resultant magnetic field and the resultant magnetic flux produced thereby, a source of drive pulses connected to said drive winding to produce magnetic flux additive to that produced by said bias winding.

7. The combination set forth in claim 4 with said core being in the form of a toroid and composed of material having a characteristic rectangular hysteresis loop.

8. The combination set forth in claim 7 with said first and second windings comprising input and output windings, said third and said fourth windings comprising drive and bias windings, a direct current power source connected to said bias winding for producing a magnetic field in said core of sufficient magnitude to carry the core material into the region of vanishing rotational hysteresis loss and clamping action between the resultant magnetic field and the resultant magnetic flux produced thereby, a source of drive pulses connected to said drive winding to produce magnetic flux additive to that produced by said bias winding.

9. A transverse magnetic amplifier for use in computer circuits comprising a tubular core of ferromagnetic material having a direct current bias winding and a pulse drive winding thereon positioned in flux adding relation, a direct current power source connected to said bias winding for producing a magnetic field in said core of sufficient magnitude to carry the core material into the region of vanishing rotational hysteresis loss and clamping action between the resultant magnetic field and the resultant magnetic flux produced thereby, a source of drive pulses connected to said drive winding to produce magnetic flux additive to that produced by said bias winding, an input winding and an output winding threading said core and positioned orthogonally with respect to said first two windings, means for energizing said input winding to establish a flux in said core orthogonal to that of said bias and drive winding, and blocking pulse means connected to said input winding for blocking energizing current in said input winding to induce a current in said output winding and provide thereby a magnetization transverse to that of said bias and drive whereby said output winding is coupled to said drive winding.

10. The combination set forth in claim 4 wherein said means for terminating current flow in said input winding and said means for deriving output signals respectively include blocking diodes in the circuits of said input and said output windings.

11. The combination set forth in claim 10 wherein said means for deriving output signals further includes a load resistor connected to said output winding.

No references cited.